OR 3,841,729

United States

Ando et al.

[11] 3,841,729

[45] Oct. 15, 1974

[54] DATA RETRIEVAL SYSTEM

[75] Inventors: Shigeru Ando; Takayuki Miyazawa, both of Amagasaki, Japan

[73] Assignee: Mitsubishi Denki Kabushiki Kaisha, Tokyo, Japan

[22] Filed: Jan. 18, 1973

[21] Appl. No.: 324,893

[30] Foreign Application Priority Data

Jan. 20, 1972 Japan .................................. 47-7943

[52] U.S. Cl. ........... 350/3.5, 250/578, 340/173 LM, 350/162 R, 350/162 SF

[51] Int. Cl. ........................................... G02b 27/00

[58] Field of Search ........... 350/3.5, 162 R, 162 SF; 340/173 AM, 173 LT, 173 LM; 235/61.11 E; 250/219 D

[56] References Cited

UNITED STATES PATENTS 3,312,955 4/1967 Lamberts et al. ............. 350/162 SF
3,542,448 11/1970 Reynolds et al. .................... 350/3.5
3,652,162 3/1972 Noble ........................... 350/162 SF

*Primary Examiner*—Ronald J. Stern
*Attorney, Agent, or Firm*—Robert E. Burns; Emmanuel J. Lobato; Bruce L. Adams

[57] ABSTRACT

Each piece of information has an address and is recorded in the form of a hologram at a different one of positions arranged in rows and columns on a memory surface. When irradiated with monochromatic light, each hologram emits beams of diffracted light in predetermined directions. The memory surface is disposed to be optically conjugated with an output surface. For those pieces of information fulfilling the requirements determined by a data mask disposed between both surfaces, the associated beams of diffracted light as passed through the data mask do not reach the conjugate positions on the output surface. Such positions have addresses being pursued. The hologram can be formed in the form of a multiple grating by embossing.

6 Claims, 15 Drawing Figures

| NAME OF PERSON | DIVISION / ITEM / ADRESS | $\phi_1$ (AGE) $\omega_1$ UNDER 20 YEARS 1 / $\omega_2$ ABOVE 20 YEARS 0 | $\phi_2$ (SALARY) $\omega_1$ UNDER 30,000 YEN 1 / $\omega_2$ ABOVE 30,000 YEN 0 | $\phi_3$ (SPECIALTY) $\omega_1$ LITERARY CULTURE 1 / $\omega_2$ SCIENTIFIC CULTURE 0 |
|---|---|---|---|---|
| $P_a$ | a | 1 | 1 | 0 |
| $P_b$ | b | 0 | 0 | 1 |
| $P_c$ | c | 1 | 0 | 0 |
| $P_d$ | d | 0 | 1 | 0 |
| $P_e$ | e | 0 | 0 | 1 |
| $P_f$ | f | 1 | 1 | 1 |

PATENTED OCT 1 5 1974 3,841,729

SHEET 3 OF 5

| ITEM / DIVISION | $\omega_1$ | $\omega_2$ | $\omega_3$ | $\omega_4$ |  |
|---|---|---|---|---|---|
| $\phi_1$ (AGE) | 18 | 19 | 20 | 21 |  |
| $\phi_2$ (SALARY) | 20,000 | 25,000 | 30,000 | 35,000 |  |
| $\phi_3$ (SPECIALTY) | ELECTRICAL ENGI-NEERING | ELECTRONIC ENGI-NEERING | MECHANICAL ENGI-NEERING | PHYSICS |  |
| $\phi_4$ |  |  |  |  |  |
|  |  |  |  |  |  |

DATA RETRIEVAL SYSTEM

BACKGROUND OF THE INVENTION

This invention relate to a data retrieval system using holograms.

It is well known that data retrieval systems can be formed through the use of holographical technique. Data retrieval systems utilizing the holographical technique are operative in accordance with the principles different from those of conventional data retrieval systems utilizing the computer, or the research of cards, and advantageous in that data can be retrieved at high speeds because of the completely parallel processing thereof, and that memory means involved can store data with a high density. Those systems are responsive to digital codes to be retrieved, applied as inputs thereto to find out addresses of corresponding pieces of information, for example, numbers assigned to the associated materials, literatures etc. However such systems are disadvantageous in that each time primary data or the original data on the basis of which hologram memories on the memory plate are formed are partly changed, the great part of the hologram memories are required to be updated. In other words, the addition and/or updating of the primary data is impossible.

SUMMARY OF THE INVENTION

Accordingly it is an object of the present invention to provide a new and improved data retrieval system facilitating the addition and/or updating of coded data to be retrieved while retaining the high speed retrieval due to the parallel processing and the high density recording provided by the prior art practice.

The invention accomplishes this object by the provision of a data retrieval system comprising, in combination, a first, a second and a third plane disposed at predetermined intervals, a record medium positioned in the first plane and having a multiplicity of positions arranged in rows and columns thereon, each of those positions being provided with diffraction means (which may be a hologram or multiple grating) having recorded thereat one one set of pieces of information encoded in accordance with a predetermined system of classification so that, when irradiated with light, the set of gratings emits beams of diffracted light in predetermined directions, the second plane including positions as predetermined by individual portions of the encoded information and having at least one aperture selectively formed at the predetermined positions in accordance with the particular requirement for retrieving the encoded information, means for irradiating the first plane with a beam of monochromatic light to selectively produce a light spot at the predetermined positions in the second plane, an optical system for rendering the first plane optically conjugated with the third plane so that, among beams of light passed through the apertures in the second plane, those beams of light resulting from each sets of gratings on the record medium are collected in the third plane at a predetermined position, and means for retrieving predetermined portions of each piece of information by whether the beams of diffracted light are collected at the predetermined positions in the third plane.

The set of gratings may preferably have recorded thereon one set of encoded pieces of information in the form of a binary number so that the beam of diffracted light is emitted in a predetermined direction for each of the binary places of the binary number.

Alternatively the set of grating may have recorded thereon one set of encoded pieces of information so that the beam of diffracted light is emitted in a predetermined direction for each of items included in different one of characteristics into which a piece of information is preliminarily sorted.

BRIEF DESCRIPTION OF THE DRAWINGS

The invention will become more readily apparent from the following detailed description taken in conjunction with the accompanying drawings in which.

Throughout several Figures like reference numerals designate the identical or similar components.

DESCRIPTION OF THE PREFERRED EMBODIMENTS

Before describing the structure of the present invention in detail, the encoding scheme in which information is encoded in the present invention will be explained. A set of primary data comprising a plurality of members has associated with each member of the set of primary data a subset of a set of secondary data. The set of secondary data is divided into $n$ divisions, and each division is divided into a plurality of items. The items and divisions corresponding to a member of the set of primary data are encoded in a code word which is stored in a memory. Each code word stored in the memory has a corresponding address which identifies its position in the memory, identifies an output of the memory associated with that code word, and identifies a member of the set of primary data corresponding to that code word.

In the example illustrated in the present application, the set of primary data is a list of names, the set of secondary data is information about each person, and is divided into three divisions; age, salary, and specialty. Each of the divisions has two items; age under and over 20 years; salary, under and over 30,000 yen; and specialty, literary and scientific.

Each division of the secondary data is represented by one binary bit and the two alternative items corresponding to each division correspond to either binary ONE or ZERO. The secondary information is encoded by $n$-bit code words wherein each bit of an $n$-bit code word corresponds to one of the $n$ divisions of the set of secondary information. Each member of the set of primary data has a corresponding $n$-bit code word which specifies the secondary information descriptive of that member of the set of primary data.

Figures 1, 2, 3:
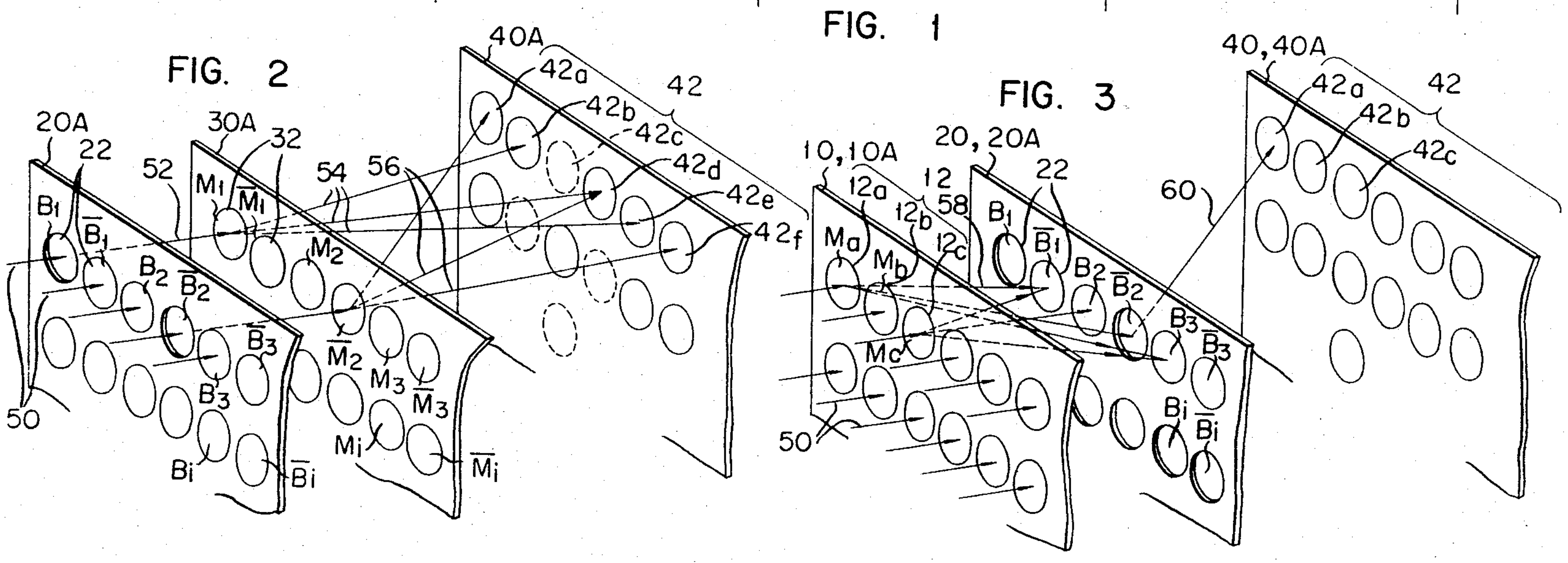
FIG. 1 is a fragmental table illustrating secondary data to be retrieved.
FIG. 2 is a fragmental perspective view of the essential portion of a data retrieval system using hologram memorys and constructed in accordance with the principles of the prior art.
FIG. 3 is a fragmental perspective view useful in explaining the principles of the present invention.

Referring now to the drawings and FIG. 1 in particular, there is illustrated one portion of a table having listed thereon secondary data adapted to be generally handled by data retrieval systems. The table is generally prepared by summarizing primary data included in a roll of names formed by the particular association. The roll of names may include a series of characteristics such as an age, a photograph, a career etc. of each of members of the association or employees therein. The table is shown in FIG. 1 as including NAMES OF $m$ MEMBERS $Pa$, P2, $Pf$ . . . in the leftmost column and ADDRESSES $a$, $b$, . . . $f$, assigned respectively to the members in the next succeeding column. The table also includes a plurality of DIVISIONS $\zeta_1$, $\zeta_2$, $\zeta_3$ . . . to be researched or retrieved in the succeeding columns. Each of the DIVISIONS is sorted into a pair of ITEMS $\omega_1$ and $\omega_2$ having assigned thereto binary ONE and ZERO respectively. For example, the DIVISION $\zeta_1$ relates to the age of each member and has the ITEM $\omega_1$ describing the particular member being under 20 years of age represented by a binary ONE and the ITEM $\omega_2$ describing the particular member being over 20 years of age represented by a binary ZERO. The DIVISION $\zeta_3$ concerns the speciality of each member and has an ITEM $\omega_1$ describing the particular member having the literary culture represented by a binary ONE and an ITEM $\omega_2$ describing his or her having the scientific culture represented by a binary ZERO. In this way, one bit has been assigned to each DIVISION. Assuming that the number of the DIVISIONS is equal to $n$, or the secondary data for each member are represented by one $n$-bit binary number having assigned thereto the same address as the associated member and form one binary coded information which may be called a "binary code" hereinafter. The $n$-bit binary numbers or codes are identical in address to the primary data for the associated members. The data retrieval is to obtain, from $m$ $n$-bit binary codes, that address assigned to a particular $n$-bit binary number including all the problematic binary places having respective binary values as required. Once that address has been found, one can extract the primary data for a particular member having the now found address from the roll of names by any means with the help of that address.

If desired, more than one bit may be assigned to each of the divisions.

The principles of the conventional type of data retrieval systems for handling $n$-bit binary codes such as shown in FIG. 1 in the form of holograms will now be described in conjunction with FIG. 2. The arrangement illustrated comprises an apertured flat plate 20A called a data mask, flat memory plate 30A and a flat output surface 40A disposed in spaced, parallel relationship. The data mask 20A has a multiplicity of positions 22 arranged in rows and columns one horizontal pair for each bit of the $n$-bit binary code. Each pair of horizontally aligned positions are provided for one pair of apertures $B_i$ and $\bar{B}_i$ where $i = 1, 2, \ldots n$. If an $i$-$th$ bit has a value of binary ONE then an aperture $B_i$ is formed at one of the associated position 22 pair, in this case, the lefthand position as viewed in FIG. 2 while an aperture $\bar{B}_i$ is not formed at the righthand position. Alternatively if, the $i$-$th$ bit has a value of binary ZERO, aperture $\bar{B}_i$ is formed at the righthand one of the associated positions 22 and no aperture $\bar{B}_i$ is formed at the lefthand position 22. In FIG. 2, the position 22 labelled $B_1$ and $\bar{B}_2$ have the apertures and all the remaining positions labelled $B_3$, $\bar{B}_3$, . . . $B_i$, $\bar{B}_i$ . . . . are not provided with apertures because the associated bits do not care in this case. In FIG. 2, the positions without apertures are shown by dotted circles.

The memory plate 30A has a multiplicity of hologram memories $M_1$, $\bar{M}_1$, $M_2$, $\bar{M}_2$, . . , $M_i$, $\bar{M}_i$ disposed thereon in aligned relationship with the positions 22 labelled $B_1$, $\bar{B}_1$, $B_2$, $\bar{B}_2$, . . . , $B_i$, $\bar{B}_i$ . . . on the data mask 20A.

Each of those memories is composed of a Fraunhofer hologram recorded on the memory plate 30A, and each pair thereof has stored thereon data for $m$ members concerning an $i$-$th$ bit of the $n$-bit binary code.

The flat output plate 40A has a multiplicity of positions 42*a*, 42*b*, 42*c* . . . 42*i* . . . . arranged in rows and columns such that with each pair of memories $M_i$ and $\bar{M}_i$ irradiated with a coherent light in a predetermined manner, the memory $\bar{M}_i$ reproduces a light spot at that position 42 corresponding to an address assigned to each member having the associated $i$-$th$ bit whose value is of a binary ONE while the memory $M_i$ reproduces a light spot at that position 42 corresponding to an address assigned to each member having the $i$-$th$ bit whose value is of a binary ZERO.

For example, it is assumed to seek for members or employees belonging to DIVISION $\zeta_1$ having ITEM $\omega_1$ (or a binary ONE), DIVISION $\zeta_2$ having ITEM $\omega_2$ (or a binary ZERO) and other DIVISIONS not caring in the table as shown in FIG. 1. Under the assumed condition, the data mask 20A has only the apertures $B_1$ and $\bar{B}_2$ as shown in FIG. 2. In the arrangement of FIG. 2, a beam of laser light 50 irradiates the data mask 20A and beam portions of laser light 52 leaving the apertures $B_1$ and $\bar{B}_2$ fall only upon the hologram memories $M_1$ and $\bar{M}_2$ on the memory plate 30A to be diffracted. Then the memory $M_1$ transmits beams of diffracted light 54 to the output surface 40A until a light spots are reproduced at those positions 42*b*, 42*d* and 42*e* corresponding to addresses $b$, $d$ and $e$ of members $P_b$, $P_d$ and $P_e$ not having the item $\omega_1$ in the division $\zeta_1$. That is, the first bit for those members is not of a binary ONE.

Similarly, the memory $\bar{M}_2$ transmits beams of diffracted light 56 to the output surface 40A to reproduce light spots at those positions 42*a*, 42*d*, and 42*f* corresponding to address *a*, *d* and *f* of members $P_a$, $P_d$ and $P_f$. In FIG. 2, those positions having the light spots on the output surface 40A are designed at solid circle while those positions having no light spot thereon are designated at dotted circle.

As a result, the output surface 40A has incident thereon no beam of diffracted light only at that position 42C corresponding to the address *c* for the member $P_c$ fulfilling the particular requirement. However at least one beam of diffracted light falls on each of those portions on the output surface corresponding to the addresses of the members not fulfilling such requirements.

Therefore one can instantaneously find out any address or addresses assigned to a member or members fulfilling the particular requirements from the *m* binary codes through the completely parallel processing as by having one light sensor disposed at that each of the positions 42 on the output surface 40A.

The conventional type of data retrieval systems using the hologram as above described is advantageous in that it effects the high speed retrieval through the parallel process and includes high density memory means but disadvantageous in the following respects. Referring to FIGS. 1 and 2, the addition of one member to the roll of names causes the necessity of updating the great part of the hologram memories on the memory plate as shown in FIG. 2 and actually at least one half and more thereof due to updating to the table as shown in FIG. 1. In general, it is required to revise the great part of the memory plate 20A each time the primary data varies. Similarly, other types of conventional data retrieval systems are also impossible to add new data to the memory means and update data.

The present invention contemplates to eliminate the disadvantages of the prior art practice as above described while retaining the abovementioned advantages thereof.

The principles of the present invention will now be described in conjunction with FIG. 3. The arrangement illustrated comprises a memory plate 10A disposed on a first plane 10 and constructed in accordance with the principles of the present invention, a data mask 20A disposed on a second plane 20 and an output surface 40A disposed on a third plane 40 with the planes 10, 20 and 40 arranged in spaced parallel relationship in the named order. The data mask 20A and the output surface 40A are identical to the corresponding components 20A and 40B shown in FIG. 2.

The memory plate 10A has a multiplicity of positions or addresses 12*a*, 12*b*, 12*c* . . . arranged in rows and columns one for each member. Unlike the memory plate 30A as shown in FIG. 2 including one pair of hologram memories provided for each bit of the *n*-bit binary codes, the memory plate 10A is provided at the positions or addresses 12*a*, 12*b*, 12*c*, . . . with hologram memories $M_a$, $M_b$, $M_c$, . . . each having stored therein one piece of information or data for a different one of the members such as shown in FIG. 1. The memories will be more fully described hereinafter. The reference character M designating the memory is suffixed with the reference character identifying the address of the associated member. For example, $M_a$ designates a memory having an address *a* and stored therein data for a member having also an address *a* for example a member $P_a$ as shown in FIG. 1.

The data mask 20A is shown in FIG. 3 as including apertures at the positions 22 labelled $B_1$ and $\bar{B}_2$ as in the arrangement of FIG. 2. Assuming that the memory $M_a$ corresponds to the member $P_a$ as shown in FIG. 1, and that a beam of monochromatic light or laser light 50 irradiates the memory plate 10A. Under the assumed condition, beams of diffracted light emitted from the memory $M_a$ are arranged to fall on the data mask 20A at a position 22 labelled $\bar{B}_1$ because the division $\zeta_1$ (or the first bit of the binary code) has the item $\omega_1$ (or a binary ONE), at a position 22 labelled $\bar{B}_2$ because the division $\zeta_2$ has the item $\omega_1$ (or a binary ONE) and at a position 22 labelled $B_3$ because the division $\zeta_3$ has the item $\omega_2$ (or a binary ZERO). Similarly, beams of diffracted light 58 from the memory $M_c$ are shown as falling on the data mask 20A at positions 22 labelled $\bar{B}_1$, $B_2$ and $B_3$ as will readily be understood from FIG. 1. In general, a beam of diffracted light from any memory M is arranged to fall on the data mask 20A at a position 22 labelled $\bar{B}_i$ as far as that bit of the binary code associated with the positions $B_i$ and $\bar{B}_i$ is of a binary ONE and at a position 22 labelled $B_i$ as far as the same bit is of a binary ZERO.

On the other hand, the data mask 20A is arranged to be provided at a position 22 labelled $B_i$ with an aperture and at a position 22 labelled $\bar{B}_i$ with no aperture when that bit of the binary code associated with those positions $B_i$ and $\bar{B}_i$ has a value of binary ONE and to be provided at the position $B_i$ with an aperture and at the position $\bar{B}_i$ with no aperture when the same bit has a value of binary ZERO.

It is assumed that the arrangement as shown in FIG. 3 is operatively associated with an optical system for causing beams of diffracted light from any hologram memory on the memory plate 10A as passed through the data mask 20A to fall on the output surface 40A at a corresponding one of the addresses or positions 42 maintained in one-to-one correspondence with the addresses or positions 12 on the memory plate 10A. Under the assumed condition, that address on the output surface 40A corresponding to any hologram memory on the memory plate 10A fulfilling the particular requirements specified on the data mask 20A has incident thereon no beam of diffracted light 60 as in the arrangement of FIG. 2. For the hologram memories not fulfilling such requirements, at least one beam of diffracted light 60 falls on each of the addresses or positions on the output surface 40A corresponding to those of the memories.

Under these circumstances, the output surface 40A may be provided at each address or position 42 with one light sensor or replaced by a phosphor screen of a pick up tube thereby to find out the addresses for those members fulfilling the particular requirements for research.

To this end, the present invention comprises an optical system for putting memory plate 10A in optically conjugate relationship with the output surface 40A. In other words, the memory plate and output surfaces 10A and 40A respectively must form an object and an image plane with respect to the optical system respectively.

Figures 4, 5, 6, 8:
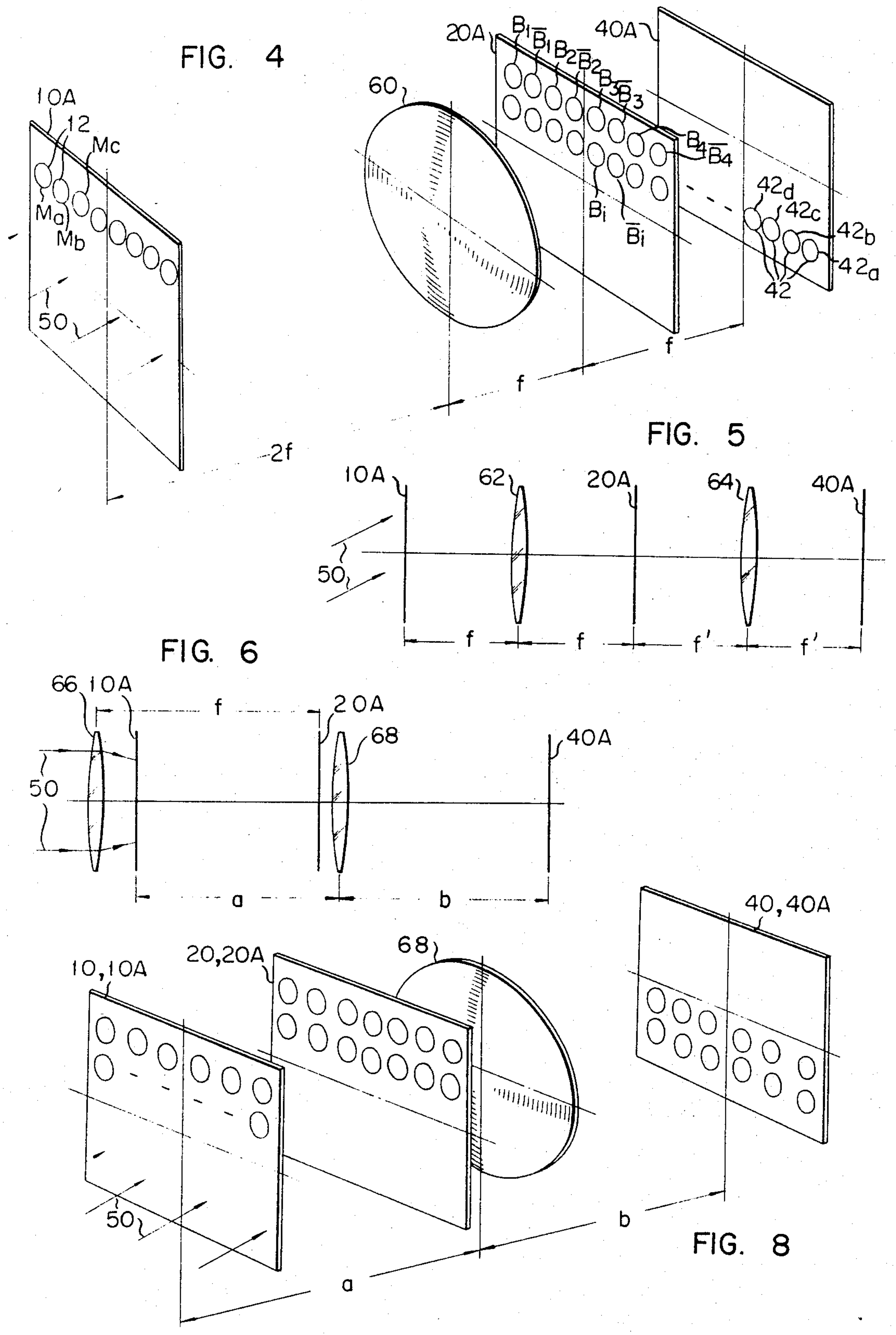
FIG. 4 is a perspective view of the essential portion of a data retrieval system constructed in accordance with the principles of the present invention.
FIG. 5 is a schematic side elevational view of a modification of the present invention.
FIG. 6 is a view similar to FIG. 5 but illustrating another modification of the present invention.
FIG. 8 is a fragmental perspective view of the essential portion of another modification of the present invention.

Referring now to FIG. 4, there is illustrated a data retrieval system constructed in accordance with the principles of the present invention. As shown in FIG. 4, the memory plate 10A is positioned at a distance of 2*f* in front of a lens 60 having a focal length of *f* while the data mask 20A is positioned at a distance of *f* in the rear of the lens 60 with the output surface 40A separated away from the data mask 20A by a distance of *f* on that side of the lens 60 remote from the memory plate 10A. The memories $M_a$, $M_b$, $M_c$, . . . on the memory plate 10A are irradiated with a beam of monochromatic light 50, for example, laser light to emit beams of diffracted light which are, in turn, incident upon the data mask 20A through the lens 60. With the memories put in the form of Fraunhofer holograms, it is possible that if an *i-th* bit of the *n*-bit binary code associated with the positions $B_i$ and $\overline{B}_i$ specifying the requirement for the particular address has a value of binary ONE that a beam of diffracted light originating from any address on the memory plate 10A reaches the position $\overline{B}_i$ on the data mask 20A. However, if the same *i-th* bit is of a binary ZERO, the same beam of diffracted light reaches the position $B_i$ on the data mask 20A. Thus the positional relationship between the addresses on the memory plate 10A and those on the output surface 40A can be determined such that, after having passed through either the aperture $B_i$ on the data mask 20A for the *i-th* bit of binary ONE or the aperture $\overline{B}_i$ for the same bit of binary ZERO, a beam of diffracted light originating from a K-*th* address on the memory plate 10A reaches a K-*th* address on the output surface 40A. Accordingly the arrangement of FIG. 4 can perform the retrieval operation as above described in conjunction with FIG. 3.

While the distances between the components as shown in FIG. 4 have the figures as above specified the present invention is not restricted to such figures. What is required is to hold the relationship $1/a + 1/b = 1/f$ where *a* is a distance between the memory plate and lens 10A and 60 respectively and *b* is a distance between the lens and output surface 60 and 40A respectively.

The arrangement of FIG. 4 holds the above relationship because the *a* and *b* are equal to 2*f*.

In FIG. 5, a first lens 62 having a focal length of *f* is disposed between the memory plate and data mask 10A and 20A respectively having a distance of 2*f* therebetween and equidistant therefrom while a second lens 64 having a focal length of *f'* is disposed between the data mask and output surface 20A and 40A respectively having a distance of *f* therebetween and equidistant therefrom. These lenses 62 and 64 thus disposed serve to cause an amplitude distribution on the memory plate 10A to correspond to a Fourier transform of that on the data mask 20A and also to cause an amplitude distribution on the data mask 20A to correspond to a Fourier transform of that on the output surface 40A while rendering the memory plate 10A in optically conjugate relationship with the output surface 40A. Thus it will be appreciated that the arrangement of FIG. 5 performs the retrieval operation as above described.

In FIG. 6 a first lens 66 having a focal length of *f* is disposed in front of the memory plate 10A to transmit a beam of laser light 50 to the latter therethrough and a second lens 68 having a focal length of *f'* is disposed in the rear of the data mask 20A spaced away from the first lens 66 by a distance of *f* with a distance between the memory plate and lens 10A and 68 respectively equal to a value of *a*. Thus the second lens 68 serves to focus any beam of diffracted light originating from the memory plate 10A onto the output surface 40A spaced away therefrom by a distance of *b* inasmuch as the relationship $1/a + 1/b = 1/f'$ is held. Thus the arrangement performs the retrieval operation as above described in conjunction with FIG. 3.

Figures 7, 12, 13, 14:
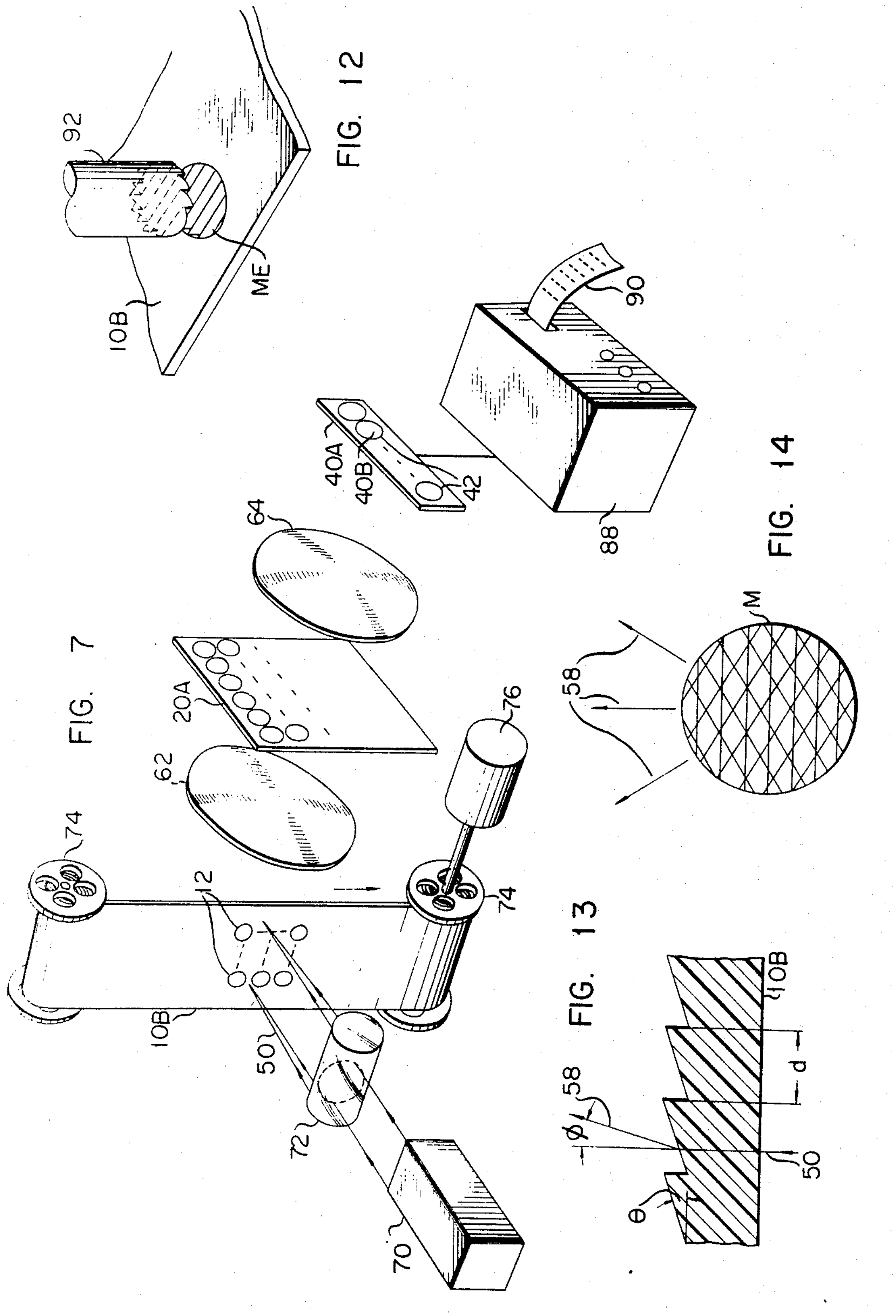
FIG. 7 is a perspective view of still another modification of the present invention, wherein a memory tape is used.
FIG. 12 is a fragmental perspective view illustrating the manner in which one type of a memory or an elementary grating used with the present invention is formed.
FIG. 13 is a fragmental cross sectional view of a phase grating formed in the manner as shown in FIG. 12 useful in explaining the diffraction of a beam of monochromatic light effected thereby.
FIG. 14 is a plan view of a multiple phase grating formed in the manner as shown in FIG. 12 and beams of monochromatic light diffracted therefrom.

Referring now to FIG. 7, there is illustrated another embodiment of the present invention wherein a memory tape is substituted for the memory plate 10A of the arrangement shown in FIG. 5. The arrangement illustrated comprises a laser device 70 for emitting a beam of laser light, a cylindrical lens 72 and a memory tape 10B irradiated with a beam of laser light 50 focussed onto the tape by cylindrical lens 72. The memory tape 10B is adapted to be moved at a predetermined fixed speed from one of a pair of spaced, vertically aligned reels 74 to the other reel 74 through an electric motor 76 operatively connected to one of the reels 74. The memory tape 10B has multiplicity of hologram memories arranged in rows and columns one for each address. Each of the memories is identical to the memory M as above described in conjunction with FIG. 3 excepting that in FIG. 7 either one or both of the primary and secondary data may be stored therein.

The memory tape 10B and the output surface 40A form the arrangement of FIG. 5 with the lenses 62 and 64 and the data mask 20. It is to be noted however that the output surface 40A as shown in FIG. 7 includes a single row of positions or addresses 42 conjugate with each row of the positions 12 on the memory tape 10B by means of the lenses 62 and 64. Then each of the positions 42 has one light sensor 30B disposed thereat. Thus the light sensors 30B are equal in the number to and conjugate with the hologram memories of each memory row. The light sensors are electrically connected to a signal processing device 88.

When the each row of hologram memories on the memory tape 10B is brought into the conjugate position with respect to the row of light sensor 40B, the latter can simultaneously read out holograms from the memories of that memory row. The processing device 88 processes the outputs from the light sensors 40B to detect the addresses fulfilling the particular requirements as specified by the data mask 20A and records the detected addresses in a single row on record medium such as a recording paper 90.

The process as above described is repeated with each of the succeeding rows on the memory tape 10B brought into their operative position.

The arrangement of FIG. 7 can successively retrieve data stored on the magnetic tape 10B at a high speed once for each predetermined numbers of addresses arranged in one row and through the parallel process. The use of the memory tape 10B is very convenient for a practical purposes.

If desired, the data mask 20A may be formed into a tape having a multiplicity of different requirements for retrieval arranged in rows and columns and adapted to be driven by driving means such as described in conjunction with the memory tape 10B.

It will readily be understood that the arrangement as shown in FIGS. 4, 5 or 6 may include a memory tape similar to the memory tape 10B in order to successively effect the parallel process as above described. If desired, the data mask 20A as shown in FIGS. 4, 5 or 6 may be replaced by a tape-shaped data mask as above described.

In the arrangements shown in FIGS. 4 through 7, an amplitude distribution in the second plane (which is shown by 20 in FIG. 3) in which the data mask 20A corresponds to a Fourier transform of that in the first plane (which is shown by 10 in FIG. 3) in which the memory plate 10A is disposed. (In the Fourier's transform, a phase term having a constant value may be negligible if desired). The memory plate 10A or tape 10B includes Fourier transform holograms. This results in the following advantages: For a given memory plate 10A having data stored thereon under predetermined conditions, the data mask 20A along with the associated optical system may have any desired dimensions and is not affected by the conditions under which data have been recorded on the memory plate 10A. Also any displacement of the memory plate 10A in its plane 10 does not cause a light spot pattern developed on the data mask 20 due to the holograms on the memory plate 10A to deviate from its predetermined position. In addition the Fraunhofer hologram with which the present invention is concerned includes generally data recorded thereon with a high density as compared with the Fresnel hologram.

From the principles of the present invention as above described it will readily be understood that the Fourier transform is not necessarily required to be held between the amplitude distributions in the planes and that the second plane may be disposed practically at any desired position between the first and third planes. In the latter event, the amplitude distributions in the first and second planes generally corresponding to the Fresnel transform of those in the second and third planes respectively. Therefore it will be apparent that as long as the first plane is optically conjugate with the third plane, any data researching system including an optical system for effecting a Fresnel transformation is involved in the scope of the present invention regardless of the position of the second plane relative to either of the other planes.

In FIG. 8 there is illustrated the essential portion of another form of the present invention utilizing a Fresnel's transformation. The arrangement illustrated is similar to that shown in FIG. 6 except for the first lens 66 as shown in FIG. 6 being omitted. It is essential that the lens 68 serves to render the memory plate 10A or the first plane 10 in optically conjugate relationship with the output surface 40A or the third plane 40. That is, the relationship $1/a + 1/b = 1/f$ should be held where $f$ designate the focal length of the lens 68, $a$ a distance between the memory plate and lens 10A and 68 respectively and $b$ designates a distance between the lens and output surface 68 and 40A. The data mask 20A or the second plane 20 is required only to traverse an optical path extending from the memory plate 10A to the output surface 40A. An amplitude distribution in the first plane 10 corresponds to a Fresnel transform of that in the second plane 20 in the optical region. The memory plate 10A includes Fresnel transform holograms.

The data mask 20A as shown in the previous Figures is generally formed of a shutter matrix having a multiplicity of shutter elements such as used with photographic cameras regularly disposed in rows and columns in its plane. Therefore it is known that upon recording Fourier holograms, an optical energy is concentrated in a focal plane involved. This may lead to an obstacle to the recording of holograms. When a position of a data mask such as mask 20A is affected by the Fourier transform, the amplitude distribution is substantially uniform resulting in the advantage that a good quality of record can readily be obtained.

In all the arrangements as above described, each of holograms has been recorded on the memory plate or tape such that for each piece of information, light is diffracted in one direction as determined by whether each of the items $\omega_j$ in a different one of the divisions $\zeta_i$ has a value of binary ONE or ZERO. That is, each piece of information has been recorded in the form of a binary number on the memory plate or tape. Instead of the hologram, a multiple grating which will be described hereinafter may be used to diffract light in the manner just described.

The pieces of information processed by the present invention is not restricted to the form of binary numbers and it is to be understood that the pieces of information may be recorded in holograms or multiple gratings by any of data recording systems other than the abovementioned system utilizing the binary number. For example, the hologram or multiple grating may be formed such that for each piece of information, it diffracts light in one predetermined direction only for a selected one of the items in each of the division in accordance with the particular requirements. In this case, the secondary data may be, by way of example, sorted as shown in FIG. 9.

Figures 9, 10:
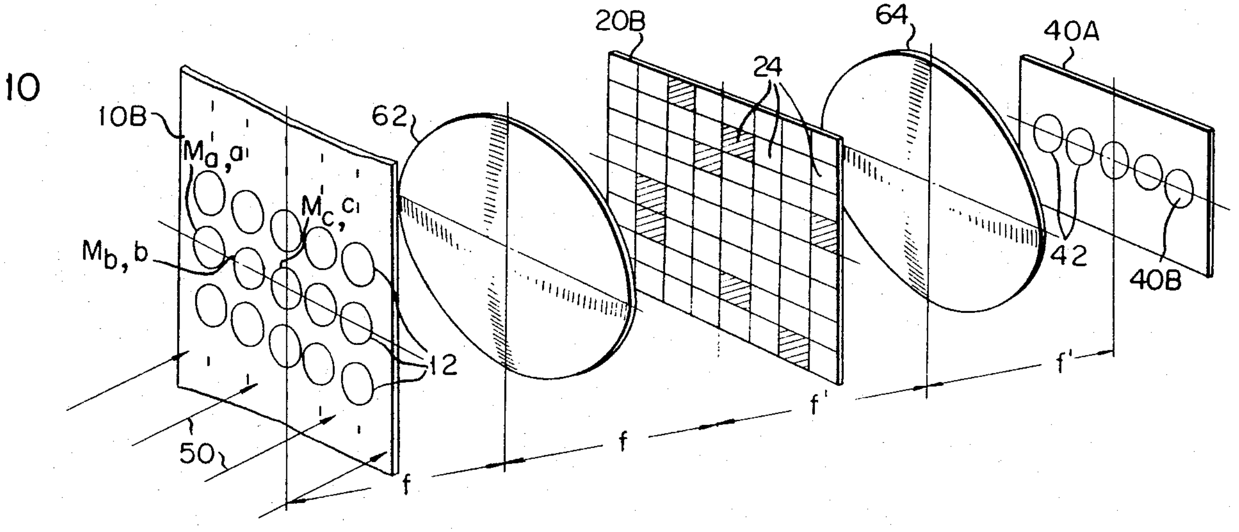
FIG. 9 is another fragmental table illustrating secondary data to be retrieved.
FIG. 10 is a fragmental perspective view of the essential portion of a modification of the arrangement shown in FIG. 7.

A table as shown in FIG. 9 is prepared in the similar manner as that illustrated in FIG. 1 and inlcudes divisions $\zeta_1, \zeta_2, \ldots$ in columns and items $\omega_1, \omega_2, \omega_3$ and $\omega_4$ in rows. For example, the division $\zeta_1$ relates to the age and has the items $\omega_1, \omega_2, \omega_3$ or $\omega_4$ meaning that the particular member is 18, 19, 20 or 21 years of age respectively. The division $\zeta_2$ has the items $\omega_1, \omega_2, \omega_3$ and $\omega_4$ meaning salaries of 20,000, 25,000, 30,000 and 35,000 yen. The division $\zeta_3$ relates to the speciality and is sorted into the electrical, electronic and mechanical engineering and physics designated by $\omega_1, \omega_2, \omega_3$ and $\omega_4$ respectively. It is to be understood that the data may be sorted in any desired manner other than that shown in FIG. 9 for the particular application.

In FIG. 10 there is illustrated another modification of the present invention particularly suitable for retrieving the data sorted in the manner as shown in FIG. 9. The arrangement is similar to that shown in FIG. 7 except for the memory tape and the data mask and identical in positional relationship to that shown in FIG. 5.

The memory tape 10B has a multiplicity of multiple phase gratings $M_a, M_b, M_c, \ldots$ disposed at their positions 12 or addresses $a, b, c, \ldots$ arranged in rows and columns thereon one for each member. Each of the multiple gratings M is adapted to diffract light only in one direction as predetermined for a selected item $\omega_j$ in each of the divisions $\zeta_i$.

As in the arrangement of FIG. 7, a beam of laser light 50 irradiating the memory tape 10B is diffracted from the multiplicity of multiple gratings $M_a, M_b, M_c, \ldots$ in their owen predetermined directions and collected on the output surface 40A after the beam portions of diffracted light has been selected by the data mask 20B in the manner as will be described hereinafter. Namely, since a plane having the memory tape disposed therein is optically conjugate with a plane having the output surface disposed therein as above described, at least one beam portion of laser light diffracted from one multiple grating having any address K is passed through the data mask 20A until it reaches that position 42 having the address K on the output surface 40A to form a real image there. In the arrangement of FIG. 10, therefore, only one real image is necessarily formed on the output surface 40A for each multiple grating M on the memory tape 10B.

The data mask 20A includes a multiplicity of closeable windows or apertures 24 arranged in rows and columns thereon as shown in FIG. 10. The details of the data mask 20A is partly shown in FIG. 11 as including one aperture row for each division and one aperture column for each item identical in arrangement to the rows and columns as shown in FIG. 9. Thus each of the windows or apertures 24 is identified by $(\zeta_i, \omega_j)$ where $i=1, 2, 3, \ldots$ and $j=1, 2, 3, \ldots$ and positioned in a direction in which the associated multiple grating diffracts light.

Figure 11:
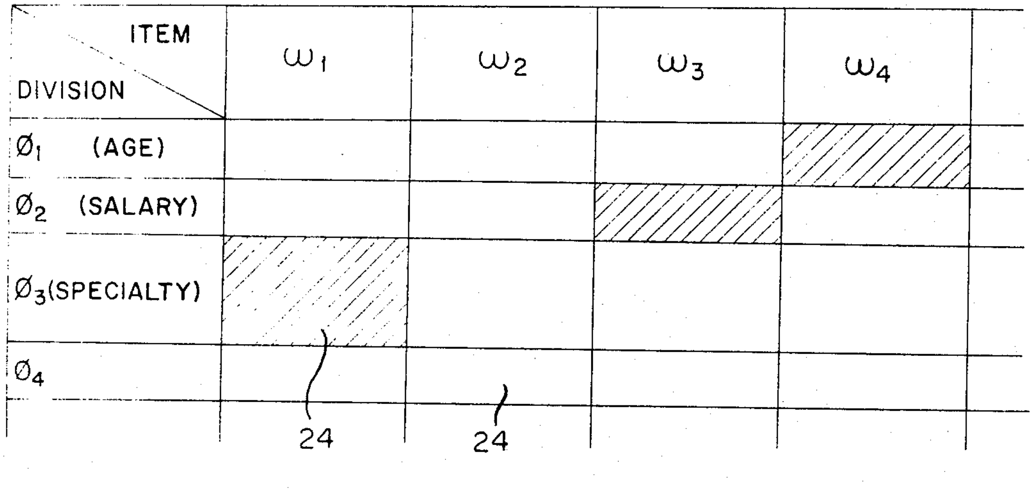
FIG. 11 is a fragmental plan view of the data mask shown in FIG. 10.

In operation, only that window or aperture 24 corresponding to a particular item $\omega_j$ required for each $\zeta_i$ of the divisions to be retrieved is first put in its closed position while all the remaining windows are maintained in their open position. In FIGS. 10 and 11, the closed windows or apertures 24 are hatched. For example, FIG. 11 shows the hatched windows or apertures $\zeta_1$, $\omega_4$; $\zeta_2$, $\omega_3$ and $\zeta_3$, $\omega_1$ depicting that the requirements to be retrieved are the age of 21, the salary of 30,000 yen, the specialily being the electrical engineering. Thus only one window or aperture is closed for that item in each division selected in accordance with the particular requirements. Then the memory tape 10B is irradiated with a beam of laser light 50 to cause each of the multiple gratings irradiated with the beam to diffract light in the predetermined directions. The beam of diffracted light from an individual one of the multiple gratings simultaneously fulfilling all the requirements is interrupted by the closed window 22 and therefore does not reach the output surface 40A. On the contrary, if the beam of diffracted light from the multiple grating does not fulfil even one of the requirements the same passes through the data mask 20A until it reaches the output surface 40A. Therefore whether or not the beam of diffracted light from each multiple grating reaches the output surface determines whether that grating does not fulfil the particular requirements. That is, if a beam of diffracted light from any multiple grating does not reach the output surface then that grating has its address to be researched.

If desired, the data mask 20A as shown in FIG. 10 or 11 may have more than one of closed windows or apertures in each row, or for each division. Also the output surface 40A may includes a plurality of rows of light sensors or a matrix of light sensors. This is true in the case of the arrangement as shown in FIG. 7.

Each of the holograms or multiple gratings on the memory plate or tape as previously described in conjunction with FIGS. 4 through 8 is usually formed as by recording interference fringes of coherent light such as laser light on the memory plate or tape in the manner well known in the art. However, according to the principles of the present invention, the hologram or multiple grating can readily be formed by embossing process.

FIG. 12 illustrates a method of forming a diffraction grating for use with the memory plate or memory tape by embossing technique. As shown in FIG. 12, an embossing die 92 is provided on the free end face with a single diffraction grating complementary in configuration to a diffraction grating to be embossed including a plurality of parallel grooves having a predetermined cross section and disposed at predetermined equal intervals. The embossing die 92 is oriented in a predetermined angular position and stamped on a film of any suitable transparent plastic material 10B under a pressure to form a diffraction grating ME thereon. Examples of such a plastic material involve polyvinyl chlorides, polyvinyl acetates, polyethylene terephthalate whose film is available under "Mylar" (trade mark) etc. The grating thus formed may be called hereinafter an elementary grating.

The diffraction grating embossed on the plastic film is shown, by way of example, in FIG. 13 as being of a saw toothed cross section. The grating as shown in FIG. 13 is known as an echelette grating characterized by a high efficiency of diffraction. With a beam of parallel monochromatic light such as laser light incident perpendicularly upon the rear flat surface of the plastic film 10B, a beam of diffracted light 58 is emitted in a direction forming an angle of $\zeta$ with the incident beam of light which angle holds the relationship:

$$d \sin \zeta = n \lambda \quad (1)$$

where $d$ designates a grating constant or the width of the grooves, $\lambda$ is a wavelength of incident light and $n$ is an integer. Assuming that the groove has its bottom tilted at an angle of $\theta$ to the plane of the plastic film 10B, and that the material of the plastic film has an index of refraction of $\gamma$, the echellete grating has a high efficiency of diffraction in a direction $\zeta$ holding the relationship $$\theta = \tan^{-1} \sin \zeta / \gamma - \cos \zeta \quad (2)$$

In this case the $\zeta$ should also satisfy the relationship (1). Thus $\zeta$ can be changed by varying either or both of $\theta$ and $d$ for the purpose of producing different type of diffraction grating. On the other hand, while $\zeta$ remains unchanged a direction in which the beam of diffracted light is emitted from the grating can be differently turned about the optical axis of the beam of incident light. More specifically, the embossing die 92 can be rotated about the longitudinal axis thereof and therefore the normal to the plane of the plastic film through an angle of $\omega$ from the initial angular position thereof after which it is stamped on the plastic film under a pressure to form a phase grating. The grating thus formed diffracts a beam of light in a direction rotated through the same angle of $\omega$ from that direction in which a beam of diffracted light is emitted from a grating formed by the same die located at its initial angular position.

The process just described can be repeated at a common position on the plastic film as required to form a multiple phase grating including a plurality of elementary gratings disposed in superposed relationship at different angular positions. FIG. 14 shows one example of such a multiple phase grating M including three elementary gratings. The grating M emits three beams of diffracted light whose projections on the plane of the plastic film are shown by the arrows 58S.

When irradiated with a beam of monochromatic light such as laser light, the multiple phase grating is adapted to emit beams of diffracted light having a common diffraction angle $\zeta$ in directions as determined by different rotational angles $\omega$'s of the beam of diffracted light with respect to a reference direction. Thus the multiple phase grating describes the items $\omega_j$ in one of the divisions $\zeta_i$ of the information as shown in FIG. 9.

Therefore a plurality of elementary gratings having different diffraction angles $\zeta_i$ by having either or both of the $d$ and $\theta$ thereof changed and different rotational angles $\omega_j$ each selected in a different one of the diffraction angles $\zeta_i$ can be embossed in superposed relationship at a common position on a plastic film to form a multiple phase grating thereon. The multiple phase grating is adapted to mit a plurality of beams of diffracted light in different directions as determined by the diffraction and rotational angles $\zeta_i$ and $\omega_j$ of the elementary grating. Thus a combination of those $\zeta$'s and $\omega$'s can correspond to a single event, in this case, that information concerning one of the members or the characteristics thereof. For example, a particular member named A is 21 year of age, receives a salary of 30,000 yen and specialyes in electrical engineering and so on. Upon forming a memory for the secondary data for the member according to the table shown in FIG. 9, the division $\omega_1$ (or the age) and the item $\omega_4$ (or the age of twenty one) are first stored in the memory by selecting an embossing die having a diffraction angle of $\zeta_1$ and stamping it at a predetermined position on a plastic film after it has been rotated through an angle of $\omega_4$ corresponding to the age of twenty one from a reference angular position thereof. For the division $\zeta_2$ (or salary), another embossing die is selected having a diffraction angle of $\zeta_2$ and then stamped in superposed repationship at the same position on the plastic film after the rotation of an angle of $\omega_3$ corresponding to the salary of 30,000 yen and so on. In this way, a plurality of embossing dies having different diffraction angles of $\zeta_1$, $\zeta_2$, $\zeta_3$, . . . are successively selected as required and stamped at a predetermined common position on a plastic film to be superposed on the preceding gratings at selected rotational angles of $\omega_1$, $\omega_2$, $\omega_3$, . . . to form a memory for the secondary data for the member A. The process as above described is repeated with each of the remaining members while the embossed position on the plastic film varies for each member to complete a memory tape such as shown at 10B in FIG. 10.

In the arrangement of FIG. 10, wherein the data mask 20A has the closeable windows or apertures 22 arranged in rows and columns, it is noted that the elementary gratings having different diffraction angles of $\zeta_i$ and different rotational angles of $\omega_j$ are embossed at predetermined positions on the memory tape 10A and at such rotational angles of $\omega_j$ that the beams of diffracted light originating from each position on the memory tape 10B reach a selected one of horizontally aligned positions forming individual row for a different one of the diffraction angles while reaching a selected one of vertically aligned positions forming an individual column for a different one of the rotational angles.

However the memory tape 10B including the multiple gratings formed as above described can be conveniently associated with a data mask including closeable apertures disposed in concentric circles as will be subsequently described in conjunction with FIG. 15.

Figure 15:
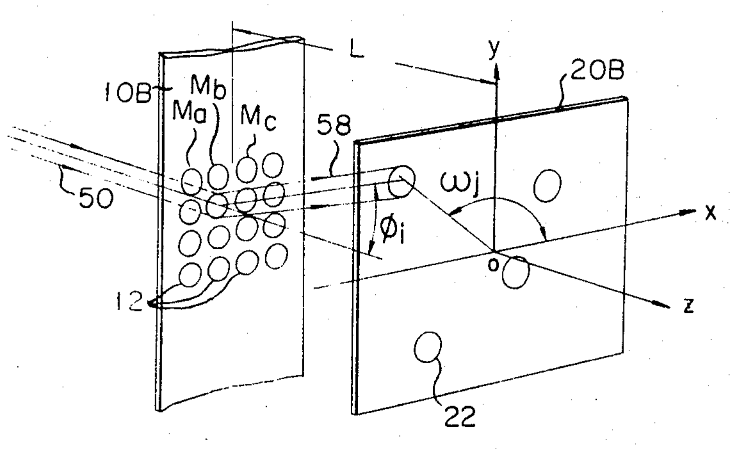
FIG. 15 is a fragmental perspective view of a system for reproducing data from a multiplicity of multiple phase gratings on a memory tape in accordance with the principles of the present invention.

IN FIG. 15, the memory tape 10B has a multiplicity of multiple phase gratings as above described disposed in rows and columns thereon and spaced away in parallel relationship from a data mask 20B by a distance of L with the center of the data mask lying in a plane orthogonal to the plane of the memory tape 10B and passing through the longitudinal axis of the latter. It is assumed that a three dimensional orthogonal coordinate system has an origin O at the center of the plane of the data mask 20B, an $xy$ plane coinciding with the masks plane and a Z axis extending away from the memory tape 10B. A multiplicity of closeable windows or apertures 22 are disposed in a plurality of concentric circles having the centers at the origin O as shown at circle in FIG. 15.

When irradiated with a beam of monochromatic light 50 along the Z axis, the multiple gratings as above described emit beams of diffracted light 58 in directions as determined by the embossing conditions $\zeta_i$ and $\omega_j$ as above described. Only for purposes of illustration, a single beam of diffracted light 58 is shown as being emitted in a direction forming an angle of $\zeta_i$ with the Z axis and having an angle of $\omega_j$ measured counterclockwise from the $X$ axis. That beam of diffracted light reaches the data mask 20B at a position lying in a circle whose radius is equal to L tan $\zeta_i$. That position has disposed thereat a closeable window identified by $\zeta_i$ and $\omega_j$. For the member A as above described, the multiple grating $M_a$ emits beams of diffracted light in directions $(\zeta_1, \omega_4)$; $(\zeta_2, \omega_3)$; $(\zeta_3, \omega_1)$.

As in the arrangement of FIG. 10, one selected window is closed for each of the concentric circles to perform the retrieval operation as above described.

The present invention has several advantages. For example, with a new member added to the roll of names, it is required only to add one hologram or multiple grating concerning the new member to the memory plate or tape. Upon updating data, those holograms or multiple gratings for the associated addresses are sufficient to be revised. The use of any suitable eraseable record medium facilitates the addition and revision of the holograms or multiple gratings. Further a multiplicity of pieces of information is excess of the capacity of hologram memory used in the conventional arrangement of FIG. 2 is possible to be retrieved at the sacrifice of a some increase in the retrieving time. The use of the memory tape permits the continuous retrieval of data at a high speed through the continuous feed of the tape.

While the present invention has been illustrated and described in conjunction with several preferred embodiments thereof it is to be understood that numerous changes and modifications may be resorted to without departing from the spirit and scope of the invention. For example, instead of the saw toothed cross section the grooves of the elementary grating may be of any suitable cross section such as sinusoidal cross section which is the simplest shape of the hologram. Also in the arrangement of FIG. 15 more than one of the windows or apertures on the data mask may be closed as in the arrangement of FIG. 10.

The term "a set of gratings" used in the following claims is intended to involve both a hologram and a multiple phase grating.

What we claim is:

1. A data retrieval system comprising, in combination:

a. a planar recording medium having a plurality of diffraction means for diffracting light disposed thereon in a matrix of rows and columns, each of said diffraction means being illuminated in use by monochromatic light, each of said diffraction means representing an $n$-bit binary numer and each of said diffraction means diffracting siad monochromatic light incident thereon into $n$ rays of monochromatic light wherein each of said $n$ diffracted rays diffracted by each of said diffraction means is representative of one bit of said $n$-bit binary number;

b. a planar opaque mask disposed parallel to said planar recording medium and receptive of said $n$ diffracted rays of light diffracted by each of said diffraction means, each of said diffraction means having means diffracting rays representative of corresponding bit positions of said $n$-bit binary numbers in directions to strike said opaque mask in one of a pair of positions common to said rays representative of said corresponding bit positions wherein one of said pair of common positions corresponds to binary zero and the other of said common positions corresponds to binary one, said mask being provided with apertures disposed to allow at selected ones of said common positions diffracted rays incident at said apertures to pass through said mask thereby defining information to be retrieved by allowing diffracted rays representative of binary numbers having values defined by the positions of said apertures to pass through said opaque mask;

c. optical focusing means focusing diffracted light rays passin through said apertures in said opaque mask to a plane optically conjugate to said planar recording medium, thereby establishing a one-to-one correspondence between said optically conjugate plane and said diffraction means on said planar recording medium; and d. optical readout means disposed in said conjugate plane in a matrix corresponding to said matrix of diffraction means on said recording medium for developing signals in response to diffracted rays of light incident thereon thereby indicating which of said diffraction means represents a binary number having said information to be retrieved.

2. A data retrieval system according to claim 1 wherein said diffracted light incident on said mask has an amplitude distribution corresponding to a Fourier transformation of said light incident on said diffraction means.

3. A data retrieval system according to claim 1 wherein said diffracted light incident on said mask has an amplitude distribution corresponding to a Fresnel transformation of said light incident on said diffraction means.

4. A data retrieval system according to claim 1 wherein said recording medium comprises a tape, and further comprising means for advancing said tape-recording medium whereby said diffraction means disposed thereon are successively illuminated and the rays diffracted by said successively illuminated diffraction means are successively readout.

5. A data retrieval system according to claim 1 wherein each of said diffraction means is a hologram.

6. A data retrieval system according to claim 1 wherein each of said diffraction means comprises a plurality of diffraction gratings, each of said gratings having a unique spatial frequency and spatial orientation.

* * * * *